United States Patent [19]

Anderson

[11] 4,243,266
[45] Jan. 6, 1981

[54] SEAT BELT SYSTEM AND CONNECTOR THEREFOR

[75] Inventor: Alexander B. Anderson, Carlisle, England

[73] Assignee: Kangol Magnet Limited, Carlisle, England

[21] Appl. No.: 14,029

[22] Filed: Feb. 22, 1979

[30] Foreign Application Priority Data

Mar. 31, 1978 [GB] United Kingdom ............... 12730/78

[51] Int. Cl.³ ...................... A62B 35/00; A47C 31/00
[52] U.S. Cl. .................................. 297/483; 297/468; 297/475
[58] Field of Search .......................... 24/198, 199, 200; 297/484, 483, 485, 473; 280/801, 808

[56] References Cited

U.S. PATENT DOCUMENTS

| 244,776 | 7/1881 | Wales | 24/198 X |
|---|---|---|---|
| 634,014 | 10/1899 | Molloy | 24/198 |
| 1,848,313 | 3/1932 | Buresh | 297/483 X |
| 2,856,991 | 10/1958 | Princiotta | 297/484 |
| 3,929,351 | 12/1975 | Fricko | 24/198 |
| 3,954,280 | 5/1976 | Roberts | 297/485 X |
| 3,982,769 | 9/1976 | Farlind | 297/483 |
| 3,992,028 | 11/1976 | Abe | 297/485 |
| 4,009,510 | 3/1977 | Lindblad | 297/483 |
| 4,142,274 | 3/1979 | Scholz | 297/483 X |

FOREIGN PATENT DOCUMENTS

| 80960 | 11/1976 | Australia | 297/483 |
|---|---|---|---|
| 2536665 | 3/1977 | Fed. Rep. of Germany | 297/483 |
| 2342083 | 9/1977 | France | 297/483 |
| 1239709 | 7/1971 | United Kingdom . | |
| 1426584 | 5/1973 | United Kingdom . | |
| 1497773 | 1/1978 | United Kingdom . | |

*Primary Examiner*—James T. McCall
*Attorney, Agent, or Firm*—Young & Thompson

[57] ABSTRACT

In a vehicle seat belt system in which the belt has a diagonal or shoulder portion and a lap or pelvis portion, the diagonal portion is connectable at a desired position to an extension of the lap portion which is stretched diagonally upright over the front of the back of the seat. A snubber device isolates the portions of the belt providing the lap portion and the extension, the upper end of which is connected to an anchorage for a retractor from which the diagonal portion downwardly extends. The diagonal portion and the extension are connected by a device such that tension in the belt as it extends forwardly over the users shoulder, tilts the device into engagement with the seat back to enhance frictional engagement therewith against inadvertent movement of the device.

9 Claims, 4 Drawing Figures

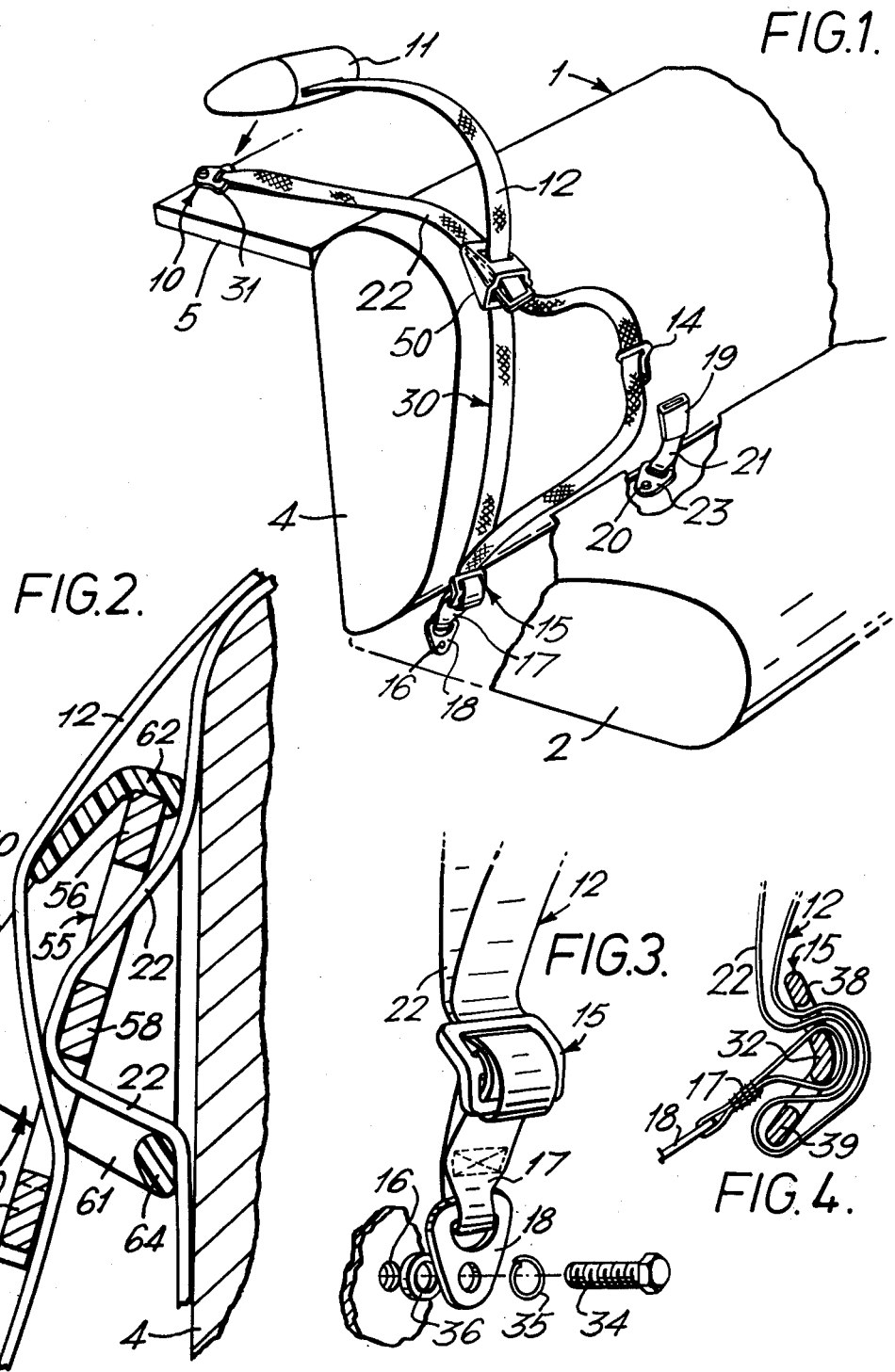

SEAT BELT SYSTEM AND CONNECTOR THEREFOR

DESCRIPTION

The invention relates to vehicle seat belt systems having a diagonal belt element and to a connector device for use in connecting belts in such a system and elsewhere.

Many seat belt systems include a belt element arranged to extend in use diagonally downwards across the torso of the occupant of a seat with which the system is associated, to a manually releasable buckle and then across the users lap, to an anchorage on the other side, so that the system constitutes a three-point or lap and diagonal system.

The diagonal belt element normally extends downwardly from a fixed position constituted by an anchorage or securement position, or by a retractor, for example an emergency locking retractor, in which the unused length of its upper end is stored. This fixed position has to be chosen so as to appropriate to the tallest persons with the normal range and is consequently located above the shoulders of shorter persons, or children of sizes intermediate between those of infants and adults, by an inconvenient amount.

An earlier proposal for dealing with this problem is disclosed in GB No. 1 367 248. According to this proposal, a seat belt support of metal plate construction is slidable in a vertical metal channel mounting secured to the vehicle door frame, the support being spring urged to engage rivets projecting therefrom into slots provided within the mounting, to releasably secure the support at a selected height. The belt can be directly secured to the support in a static system or slidably anchored in the support where the belt comes from an inertia reel. This proposal has the disadvantage of requiring a considerable structure for its realisation so that it cannot in practice be added to an existing vehicle. Moreover, the vertical position of the support cannot be infinitely adjusted but must be selected from preset possibilities. The securement of the mounting on the vehicle door severely limits the seat belt configurations with which it can be employed and there is no possibility of moving the support backwards or forwards in the vehicle to accommodate corresponding adjustment of the associated vehicle seat.

It is thus an object of the present invention to provide for the adjustment of the upper connection position of a diagonal belt element of a seat belt system by means which are simple to produce and to use and which can readily be added to a vehicle to which the system is already fitted.

The present invention accordingly provides that the belt is taken upwardly from the anchorage on the other side, so as to extend against the front of the seat back, to the fixed position or to a position nearby, and provision is made for connection to be made between the diagonal belt portion and the fixed length extending over the seat back. The connection may be optional at the discretion of the user and/or it may be at a selected position along the fixed length. At the anchorage, the belt is advantageously made to extend through a snubber device effective to isolate the fixed length of belt from the portion thereof adapted to restrain the occupant of the seat.

Where the connection position is to be selectable along the fixed length of belt the device by which connection is affected is desirably such as to be firmly retained in the selected position along the strap to which it has been moved.

It is accordingly also an object of the present invention to provide a connector for receiving two elongate members therethrough, one of which members extends along a backing surface, such that tension in the other member enhances frictional engagement between the connector and the surface. It is a further object of the invention to provide a safety belt system for a vehicle seat including a diagonal or shoulder belt element and a strap to which the belt element can be connected at a selected position therealong by means of a slidable connector, in which the connector is held in the selected position by forces acting on the belt element in use.

The invention accordingly further provides a connector apertured for receiving therethrough a first elongate member extending over a backing surface to permit sliding of the connector along the member, and to receive a second elongate member with lengthwise tension in the second member acting on the connector to urge part thereof against said surface.

In the context of a safety belt system for a vehicle seat in which the second member is a diagonal belt element and the first element is an auxiliary strap secured against the front surface of the back portion of the seat, the connector is urged by the belt element, when it assumes in use a direction away from the surface to extend over a users shoulder, to engage the surface directly or through the strap, so as to oppose forces tending to move it along the strap.

The invention will be readily understood from the following illustrative description of a preferred embodiment thereof and from the accompanying drawing, in which:

FIG. 1 is a perspective view of a seat belt system with a shoulder height adjustment device in accordance with the invention, the system being fitted to a vehicle seat of which parts are shown broken away;

FIG. 2 is a sectional side view on a larger scale of a connector included in the system of FIG. 1;

FIG. 3 is a perspective view of a snubber device included in the system of FIG. 1, again on a larger scale; and FIG. 4 is a sectional side view of the snubber device.

FIG. 1 somewhat schematically shows the right-hand side of the rear setting of a passenger vehicle, typically a private motor vehicle. The seating comprises a seat portion 2 and a squab or back portion 4. For use by an occupant of the right hand side of the illustrated seating there is provided a 3-point safety belt system comprising a retractor 11 which may incorporate a belt and/or vehicle sensitive locking mechanism, secured to a first anchorage 10 to the rear of the seating, conveniently as shown on a parcel shelf 5 behind it. Where the vehicle is an estate type vehicle without the parcel shelf 5, the strap 22 can extend over the back of the seat and downwardly to a retractor secured to a suitably positioned anchorage for example on the seat back or the vehicle floor.

The belt 12 can be withdrawn for use from the retractor 11 against the pull of a rewind spring within the retractor. The belt 12 extends in use from the retractor 11 diagonally downwards to a tongue 14 of a releasable two-part buckle and through an aperture in the tongue to a snubber device 15. The snubber device 15 is permanently secured to a second anchorage 16, as by a short length of belt 17 which extends between the snubber device and an anchor bracket 18. The snubber device can instead include a rigid bracket portion by which it is directly connected to the vehicle at the anchorage. The anchorage 16 is at the right hand side of the seating so as to be to the right of a user of the seat belt system. To the left of the user, the tongue 14 is releasably connected in use with a socket member 19 of the buckle which is secured to a third anchorage 20 by means of a short length of belt 21 and connected to an anchor bracket 23.

Instead, a bracket or non-resilient wire can connect the socket member 19 to the anchorage 21. The belt 12 in use thus has a diagonal or shoulder portion between the retractor 11 and the tongue 14, and a lap or pelvis portion between the tongue 14 and the snubber device 15.

When out of use, the tongue 14 is disconnected from the buckle socket member 19 and the retractor 11 pulls the belt 12 so that it extends directly between the retractor and the anchorage 16. An occupant of the seating will place himself between the belt 12 and the buckle member 19 and will move the tongue 14 across him to assemble it with the member 19 so that the belt 12 forms the lap and diagonal portions.

It will be seen that the upper end of the diagonal portion of the belt 12, of the system as so far described, is defined by the position of the retractor 11. This is appropriate to normal adult shoulder heights but not to lesser shoulder heights for example those of children. Means is therefore provided whereby the effective position of the upper end of the diagonal belt portion can be selectively adjusted. This means is constituted by an adjustment device 30 comprising a portion 22 of the belt 12 extending upwardly from the snubber device 15 over the front surface of the seat back portion 4, along which a connector 50 receiving the shoulder portion of the belt 12 can be moved to a selected position. The upper end of the belt portion 22 is secured to an anchor bracket 31 by which it is connected to the vehicle at the retractor anchorage 10. Although it is convenient to use the already available anchorage 10 for the upper end of the belt portion 22, this can be secured at a different position if preferred. The connector 50 is slidably threaded on the belt portion 22 between the length adjusting means 26 and the lower bracket 25.

In use, the connector 50 is moved along the belt portion 22 until it is at a height just above the shoulder of the occupant. The connector then provides the position from which the effective length of the diagonal portion of the seat belt 12 extends, this position being selectively adjustable along the length of the belt portion 22 to suit the occupant. The position can be so far down the belt portion 22 if desired that the belt 12 functions as a lap or pelvis belt. The shoulder height adjustment device 30 constituted by the belt portion 22 and the connector 50 can be taken out of effective use simply by sliding the connector along the belt portion upwardly for example over the seat back.

The construction of the connector 50 establishing the slide connection between the seat belt 12 and the adjustment strap 22 is shown in detail in FIG 2. The connector comprises a three-bar link 55, formed by a slotted metal plate or by three cross bars secured at their ends to side members, and an outer casing 60 which can be moulded in rigid plastics material. The belt portion 22 extends under the upper bar 56 of the link 55 and over the central bar 58 between them.

The casing 60 has side walls 61 joined by an upper wall 62 and a lower bar 64 between which is defined an aperture adjacent the seat back portion 4. The belt portion 22 extends under the wall 62 and the bar 64 to the central bar 58. The casing 60 also has an outer wall 65 between the side walls 61 which is spaced from the upper wall 62 and the lower bar 64 to provide upper and lower openings. The link 55 is secured within the casing by connection of its sides to the side walls 61 with the upper bar 56 engaging the upper wall 62 and so as to project downwardly through the lower casing opening with the lowest bar 57 outside the casing and spaced outwardly from the seat back portion 4. The diagonal portion of the seat belt 12 extends downwardly through the upper casing opening and between the lowest bar 57 and the central bar 58 of the link 55. The belt portion 22 is located close against the seat back 4 so that any tension in the strap will tend to pull the central bar 58 and thus the whole connector 50 towards the seat back. There is consequently resistance to movement of the connector 50 along the belt portion 22 which can however be overcome manually by pulling or pushing the connector in the desired direction.

The lower end of the seat belt 12 which emerges from the connector 50 to form the effective shoulder portion of the belt will extend in use away from the seat back 4 over the occupants shoulder, so the tension in the belt due to the retractor rewind spring will tend to tilt the connector 50 so as to enhance the pressure with which the upper wall 62 bears on the belt portion 22. This effect is increased if the occupant moves forward rapidly in emergency deceleration of the vehicle. The connector 50 is consequently firmly held in use in its selected position along the belt portion 22 by a pressure which is relaxed only when the belt is released by separation of the tongue 14 from the buckle socket part 19.

Whatever the position of the connector 50, the seat belt 12 can be readily withdrawn from the retractor 11, or drawn back into it, as its engagement with the lower edge of the upper wall 62 and the lowest bar 57 of the link 55 imposes only a light frictional restraint.

As the seat belt 12 extends downwardly in use from the connector 50 at a transverse inclination to the strap 22, the slot between the link bars 57 and 58 may be tapered as shown to incline the bar 57 in the same direction.

The connector however otherwise constructed can incorporate a snubber means if stronger frictional engagement with the belt portion 22 is required.

Although the connector of the present invention has particular applicability to a seat belt system illustrated and described, it may be employed also in a seat belt system incorporating an adjustment device of the kind described in U.S. applications Ser. Nos. 14,027 and 14,028, filed Feb. 22, 1979. Instead of the connector 50, the adjustment device can include other forms of connector for example a link member as shown and described in the Pollitt et al Application, the contents of which are to be regarded as incorporated herein.

The snubber device 15 will be more readily understood from FIGS. 3 and 4. The device will be seen to comprise a three-bar link having the belt length 17 looped around its centre bar 32 and through a slot in the bracket 18 with its ends secured to its middle between the device 15 and this bracket. The bracket 18 is secured to the anchorage 16, constituted by a tapped hole in the vehicle floor for example, by a headed set screw 34 which extends successively through a spring washer 35, an aperture in the bracket 18 and a spacer 36 into the anchorage hole. The part of the belt 12 forming the diagonal belt portion is taken underneath the uppermost bar 38 of the device 15, that is, between the bar and the back portion 4, over the centre bar 32 and the lowermost bar 39 and then upwardly between the bars 39 and 32 and back between the bars 32 and 38 to form the portion 22.

The belt portion 22 is required to be fairly tightly stretched over the seat back portion 4. On installation the upper end of the belt portion 22 is secured to the anchorage 10 or other suitable anchorage by the bracket 24. The snubber device 15 is placed to permit securement of the bracket 18 at the anchorage 16 and the belt 12 is pulled through the device to apply the necessary tension. This is effected by feeding both the belt portion 22 and the lap portion through the snubber device 15, pulling on the loop around the lower bar 29, and then pulling on the lap portion. Adjustment in either direction can be made after installation but the device 15 will not otherwise allow the belt to be drawn through it in either direction so that the lengths of the belt which function respectively as part of the seat belt system and as part of the adjustment device are reliably isolated.

No device for adjusting the length of the belt portion 22 is therefore required, as any surplus belt length is accommodated in the retractor 11. If the system is static, that is, if it does not include a retractor and has both belt ends secured to the anchorage 10, a length adjuster will be provided for the length of the belt 12 constituting the safety belt.

The invention thus provides shoulder height adjustment devices as described suitable for addition to vehicles with existing seat belt systems for incorporation as original equipment or inclusion in seat belt systems to be fitted either to new or to existing vehicles. The seat belt system in or with which an adjustment device of the invention is employed can be of any kind having a diagonal or shoulder belt or belt portion, whether or not associated with a lap or pelvis belt or belt portion.

It will be evident that the embodiments specifically described herein may be modified by those skilled in the art on the basis of the present disclosure without departure from the present inventive concepts. The present invention is thus to be regarded as embracing each and every novel feature and combination of novel features herein disclosed and as limited solely by the spirit and scope of the appended claims.

I claim:

1. A safety belt system for restraining an occupant in a vehicle seat having a back portion, said system comprising:
    a shoulder belt adapted to extend in use diagonally across the front of the occupant from an upper first position above the occupant's shoulder on one side of the seat to a second lower position on the other side of the seat;
    an elongate element extending generally upright over said back portion on said one side of said seat; and
    connector means adapted to connect together said shoulder belt and said elongate element at a selected position, said connector means comprising:
    spaced upper, central and lower bars, said elongate element being receiving through the spaces between said upper, central and lower bars,
    first edge means located outwardly of said elongate element from said back portion and facing outwardly thereof, and
    second edge means located below said first edge means and outwardly of said elongate element from said back portion and facing inwardly towards said back portion,
    said shoulder belt being received over said first edge means and under said second edge means,
    whereby tension in said shoulder belt in use urges said upper bar against said back portion therebeneath, to thereby resist movement of the connector means along said elongate element.

2. The seat belt system of claim 1 wherein said upper and central bars are constituted by two adjacent bars of a planar three-bar link, said second edge means is constituted by the third bar of said third bar link, and said first edge means and said lower bar are constituted by an apertured housing in which said three-bar link is secured.

3. The seat belt system of claim 1 further comprising belt means continuing said shoulder belt in use from a releasable connection at said second lower position across the lap of the occupant to a third lower position on said one side of said seat, and wherein said elongate element is constituted by a continuation of said belt means through said third position.

4. The seat belt system of claim 1 wherein said third bar is inclined relative to said two adjacent bars in the diagonal direction of said shoulder belt.

5. A safety belt system for restraining an occupant in a vehicle seat having a back portion, the system comprising belt means, said belt means having in use a first portion extending diagonally across the front of the occupant from an upper first position above the occupant's shoulder at one side of the seat to means releasably connecting said belt means with a vehicle anchorage at a second lower position at the other side of the seat, a second portion extending in use from said releasable connection means to a third lower position at the one side of the seat, and a third portion extending upwardly over the seat back from the third position to a fourth upper position on the one side of the seat, and connector means for connecting together said first and third portions at a selected position, said belt means being continuous through said third position.

6. The seat belt system of claim 5 having at said third position snubber means with said belt means extending therethrough, said snubber means being adapted to frictionally oppose movement of said belt means therethrough.

7. The seat belt system of claim 5 wherein said belt means is continuous through said means releasably connecting said belt means with said vehicle anchorage.

8. The seat belt system of claim 5 wherein said first and fourth upper positions are coincident.

9. The seat belt system of claim 5 having at said first position belt retractor means biassed to draw thereinto said first portion of said belt means.

* * * * *